(12) United States Patent
Mori et al.

(10) Patent No.: US 7,997,363 B2
(45) Date of Patent: Aug. 16, 2011

(54) VEHICLE CONTROL SYSTEM AND METHOD

(75) Inventors: Katsuyuki Mori, Ichinomiya (JP); Mamoru Sawada, Yokkaichi (JP); Toshiki Matsumoto, Kariya (JP); Takehito Fujii, Anjo (JP)

(73) Assignee: Denso Corporation, Kariya (JP)

( * ) Notice: Subject to any disclaimer, the term of this patent is extended or adjusted under 35 U.S.C. 154(b) by 357 days.

(21) Appl. No.: 12/283,066

(22) Filed: Sep. 9, 2008

(65) Prior Publication Data
US 2009/0071736 A1   Mar. 19, 2009

(30) Foreign Application Priority Data
Sep. 17, 2007   (JP) ................. 2007-240322

(51) Int. Cl.
*B60W 10/00* (2006.01)
*B60W 10/06* (2006.01)
*B60W 10/08* (2006.01)

(52) U.S. Cl. ............... 180/65.265; 903/930; 701/22

(58) Field of Classification Search ........... 180/65.265, 180/65.28, 65.285, 65.29; 903/930; 701/22, 701/54, 70, 110
See application file for complete search history.

(56) References Cited

U.S. PATENT DOCUMENTS

| | | | |
|---|---|---|---|
| 6,336,070 B1 * | 1/2002 | Lorenz et al. | 701/102 |
| 6,441,506 B2 * | 8/2002 | Nakashima | 290/40 C |
| 6,621,244 B1 * | 9/2003 | Kiyomiya et al. | 318/611 |
| 7,110,867 B2 * | 9/2006 | Imazu | 701/22 |
| 7,317,978 B2 * | 1/2008 | Ashizawa et al. | 701/54 |
| 7,599,763 B2 * | 10/2009 | Matsumoto et al. | 701/1 |
| 7,633,257 B2 * | 12/2009 | Sakamoto et al. | 318/611 |
| 2001/0020789 A1 | 9/2001 | Nakashima | |
| 2005/0065690 A1 | 3/2005 | Ashizawa et al. | |
| 2006/0041353 A1 | 2/2006 | Sawada et al. | |

FOREIGN PATENT DOCUMENTS

| | | |
|---|---|---|
| EP | 1 221 394 | 7/2002 |
| JP | 07-103008 | 4/1995 |
| JP | 10-285706 | 10/1998 |
| JP | 2006-60936 | 3/2006 |

OTHER PUBLICATIONS

European Search Report dated Jul. 29, 2010.
Office action dated Aug. 10, 2010 in corresponding Chinese Application No. 2008 10149673.8.

* cited by examiner

*Primary Examiner* — John Walters
(74) *Attorney, Agent, or Firm* — Harness, Dickey & Pierce, PLC

(57) ABSTRACT

A vehicle control system calculates driver-required wheel torque, correction wheel torque to stabilize vehicle motion, required output shaft torque, alternator base torque, target engine torque and alternator torque to realize the output shaft torque. The required output shaft torque is required to realize vehicle motion, and the alternator base torque is required to maintain amounts of electric power in batteries. In order to realize the torque including wide band frequency torque, a torque division unit divides the sum of the torque into each torque actuator response frequency torque. Therefore, the target alternator torque is calculated by the alternator base torque to maintain electric power in batteries and high frequency band torque required by vehicle motion control.

4 Claims, 6 Drawing Sheets

VEHICLE CONTROL SYSTEM AND METHOD

CROSS REFERENCE TO RELATED APPLICATION

This application is based on and incorporates herein by reference Japanese Patent Application No. 2007-240322 filed on Sep. 17, 2007.

FIELD OF THE INVENTION

This invention relates to a vehicle control system and method for suppressing vibration occurring in various portions of a vehicle by adjusting axle torque produced by an internal combustion engine and an electric power generator such as an alternator or a motor-generator.

BACKGROUND OF THE INVENTION

In a conventional vehicle control system disclosed in, for instance, US 2006/0041353 (JP 2006-60936A), a required axle torque calculation unit calculates required axle torque which varies depending, for example, upon the amount an accelerator pedal is operated by a driver of a vehicle. The required axle torque calculation unit calculates the required axle torque as the sum of a first axle torque produced by an internal combustion engine and second axle torque produced by an auxiliary machine such as a motor-generator. The required axle torque is used for accelerating or decelerating the vehicle. Here, the required axle torque calculation unit distributes the required axle torque into the first axle torque and the second axle torque in a manner to enhance the energy efficiency depending upon the traveling condition of the vehicle, and the internal combustion engine and the motor-generator produce the thus distributed axle torque.

If the required axle torque calculated by the required axle torque calculation unit is produced by a power plant that includes the internal combustion engine and the auxiliary machine as calculated, the vehicle, in many cases, produces extra energy in excess of energy necessary for realizing the traveling of the vehicle estimated by the driver. The driver tends to require the power plant of the vehicle to produce more power than what is required in order to realize the traveling of the vehicle estimated by the driver himself. Due to the extra power, the vehicle chassis vibrates while the vehicle is traveling as represented by, for example, squat.

To suppress the occurrence of vibration of the vehicle chassis while the vehicle is traveling, therefore, the conventional system is equipped with a pitching vibration correction unit for correcting the axle torque distributed to the auxiliary machine through the required axle torque calculation unit. Specifically, the pitching vibration correction unit calculates the torque input to the vehicle chassis, which is the torque actually produced by the power plant and is input to the vehicle chassis depending upon the amount of the air taken in by the internal combustion engine detected by an intake air amount sensor and an electric current detected by a current sensor that detects the electric current flowing through the auxiliary machine. Next, the pitching vibration correction unit calculates the pitching vibration energy, which corresponds to extra energy, consumed by the occurrence of pitching vibration based upon the calculated torque input to the vehicle chassis and a vibration model on the springs. The pitching vibration correction unit removes the torque corresponding to the pitching vibration energy from the above second axle torque, and drives the auxiliary machine so as to produce the corrected second axle torque. This suppresses the occurrence of pitching vibration of the vehicle chassis.

However, the conventional vehicle control system fails to maintain a storage battery in a favorable condition to supply electric power to various vehicle-mounted devices.

That is, in a condition where a large amount of electric power is needed to drive various vehicle-mounted devices and the amount of the electric power stored in the storage battery is not enough, the auxiliary machine must work as a generator to electrically charge the storage battery. The conventional vehicle control system, however, fails to have the auxiliary machine work to exhibit the function that is needed. Even under the above condition, therefore, the auxiliary machine often works as the motor. As a result, though the pitching vibration can be suppressed from occurring on the vehicle chassis, the electric power stored in the battery becomes in short supply that often causes the operation of the vehicle-mounted devices to lose stability.

The above situation could likewise occur not only when the motor-generator that works as a motor or a generator is used as the auxiliary machine but also when an alternator that works as a generator is used as the auxiliary machine.

When the vehicle is traveling, further, not only the vehicle chassis vibrates but also every part of the vehicle vibrates.

SUMMARY OF THE INVENTION

It is therefore an object of the present invention to provide a vehicle control system capable of suitably suppressing useless vibration that occurs at various portions of a vehicle, and is changed into electric power by an electric power generator, yet favorably maintaining the amount of electric power stored in a storage device.

According to the present invention, a vehicle control system is provided for a vehicle, which has a storage battery unit connected to vehicle-mounted devices to feed electric power to the vehicle-mounted devices and a power plant used as torque actuators including an internal combustion engine and a generator that generates electricity by using torque of an output shaft of the internal combustion engine and electrically charges the storage battery unit. The vehicle control system further has a driver-required wheel torque calculation unit, a correction wheel torque calculation unit, a battery-required alternator torque calculation unit, a torque division unit and a torque actuator control unit.

The driver-required wheel torque calculation unit calculates required wheel torque required by a driver of the vehicle. The correction wheel torque calculation unit calculates the correction torque for the driver-required wheel torque to stabilize vehicle by estimating vibrating conditions at portions of the vehicle. The battery-required alternator torque calculation unit calculates alternator base torque for maintaining stored amount of electric power by monitoring amount of electric power stored in the storage battery unit. The alternator base torque is required by the storage battery unit to generate the electric power for maintaining a predetermined base amount of the electric power. The torque division unit divides required output shaft torque into each torque actuator response frequency torque in order to calculate target torque for the torque actuator. The torque actuator control unit controls the internal combustion engine and the generator when the vibrations at the portions of the vehicle are of a low frequency band and a high frequency band, respectively, so that the output shaft torque produced by the internal combustion engine and the generator corresponds to the driver-required output shaft torque corrected by the correction torque.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENT

First Embodiment

Figure 1:
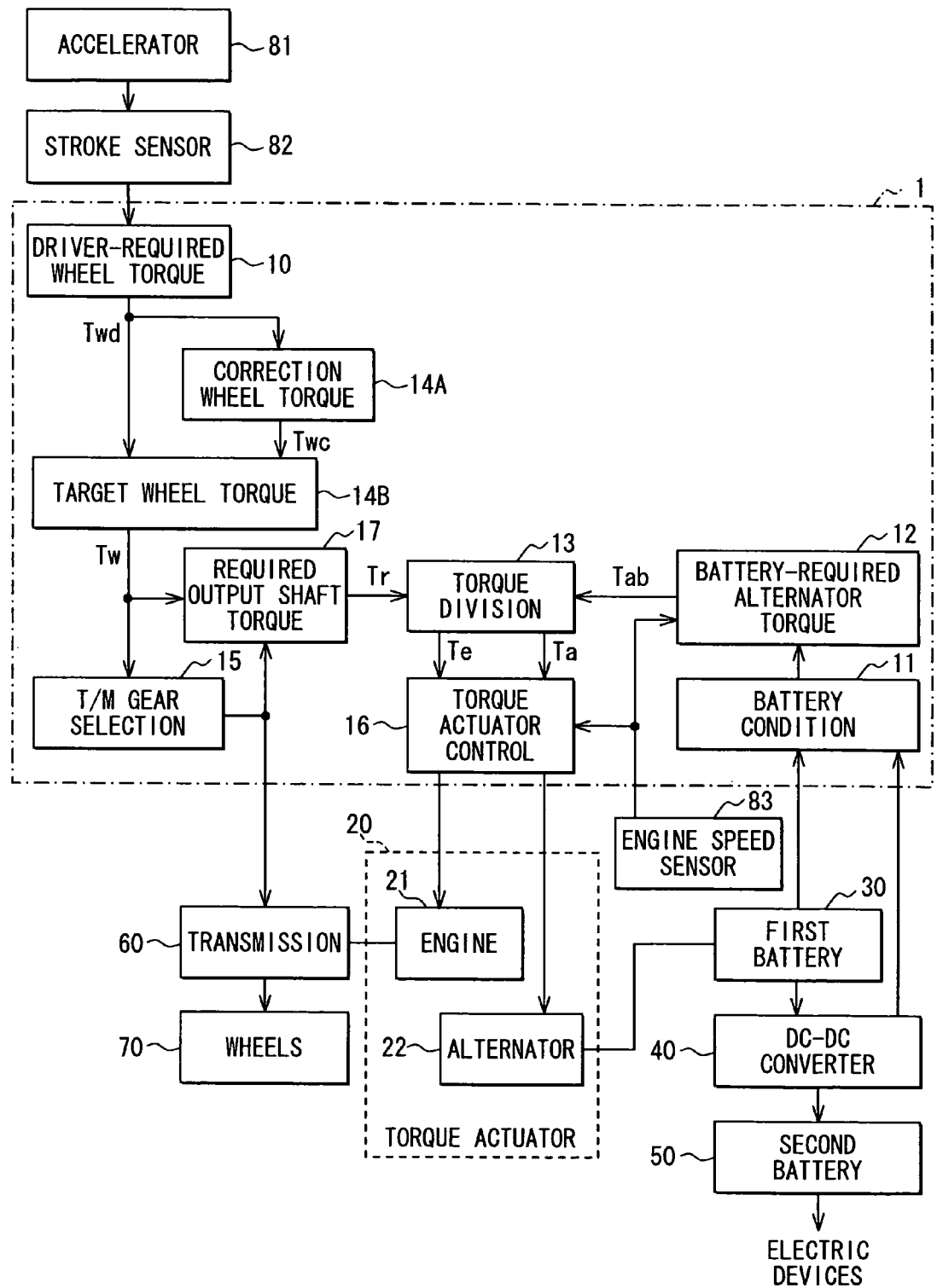
FIG. 1 is a block diagram illustrating a first embodiment of a vehicle control system of the invention.

Referring first to FIG. 1, a vehicle basically includes a torque actuator (power source) 20, a first battery (first power storage unit) 30, a DC-DC converter (voltage-regulating unit) 40, a second battery (second power storage unit) 50, a transmission (T/M) 60 and wheels 70.

The torque actuator 20 includes an internal combustion engine 21 and an alternator (electric power generator) 22 and is connected to a vehicle control system 1. The internal combustion engine 21 produces a torque on its output shaft (not shown) while being controlled by the vehicle control system 1, and the output shaft torque that is produced is transmitted to the wheels 70 via the transmission 60 inclusive of gear systems, such as a transmission and differential gears. As will be described later, the torque that can be produced on the output shaft by the internal combustion engine 21 (particularly, the intake system) is usually set to a frequency of "5 Hz or lower" (the torque response frequency is "5 Hz or lower"). Further, a T/M gear selection unit 15 is connected to the transmission 60, and the gear ratio (gear) of the transmission is selected through the vehicle control system 1.

The alternator 22 is coupled, via a belt (not shown), to a pulley (not shown) attached to the output shaft of the internal combustion engine 21. The alternator 22 generates the electric energy by using the torque on the output shaft. In the alternator 22, the length and thickness of the winding are so set as to decrease the impedance of the coil that constitutes the alternator 22, so that the frequency of torque for generating electricity by using the axle torque is improved (e.g., 10 to 30 Hz) as compared to the ordinary alternators. The frequency can be converted into a time constant of "30 milliseconds or shorter". Thus, the response frequency band of the alternator 22 is set to be higher than the intake air response frequency band of the internal combustion engine 21.

The first battery 30 is directly connected to the alternator 22 and stores the electric energy (electric power) produced by the alternator 22. The first battery 30 is connected, via the DC-DC converter 40, to the second battery 50 that is connected to various vehicle-mounted devices (not shown) to feed electric energy thereto. The DC-DC converter 40 is a regulator, which regulates the voltage of electric energy stored in the first battery 30 and the voltage of electric energy stored in the second battery 50. The first battery 30 is connected to a battery condition detection unit 11 of the vehicle control system 1, and the voltage and current of electric energy stored in the first battery 30 are detected by the vehicle control system 1. The DC-DC converter 40, too, is connected to the vehicle control system 1, and a DC-DC current flowing through the DC-DC converter 40 is detected by the vehicle control system 1.

The vehicle includes various sensors, such as an accelerator stroke sensor 82 for detecting the amount an accelerator pedal 81 is depressed by the driver of the vehicle and an engine rotational speed sensor 83 for detecting the rotational speed of the internal combustion engine 21.

The accelerator stroke sensor 82 is connected to the vehicle control system 1, specifically to a driver-required wheel torque calculation unit 10 for calculating driver-required wheel torque Twd. A correction wheel torque calculation unit 14A may be provided to produce correction wheel torque Twc, which is necessary to control motion of the vehicle. A target wheel torque calculation unit 14B is provided to calculate target wheel torque by correcting the driver-required wheel torque Twd by the correction wheel torque Twc. A required output shaft torque calculation unit 17 is provided to calculate output shaft torque Tr that equals the driver-required wheel torque divided by a product of the T/M gear ratio by the differential gear ratio.

The engine rotational speed sensor 83 is connected to a battery-required alternator toque calculation unit 12 for calculating alternator base torque (negative value of torque) Tab for maintaining the stored amount of electric power.

As described above, the required output shaft torque Tr is calculated according to the amount of operation of the accelerator pedal 81 which is detected through the accelerator stroke sensor 82. Here, the larger the amount the accelerator pedal 81 is depressed, the more the driver of the vehicle requires the torque actuator 20 to produce large output shaft torque.

The vehicle is equipped with the alternator 22 which generates electricity by using part of the torque produced on the output shaft by the internal combustion engine 21 to mainly maintain a reference amount of electric power in the first storage battery 30. The electric energy stored in the first battery is also stored in the second battery 50 via the DC-DC converter 40, and the electric energy stored in the second battery 50 is fed to various vehicle-mounted devices (not shown). Therefore, if no consideration is given to the amount of electric power stored in the first and second storage batteries 30 and 50 as a result of paying too much concern to suppressing vibration that occurs at various portions of the vehicle as will be described later, the operations of various vehicle-mounted devices lose stability as described above.

Therefore, the battery-required alternator toque calculation unit 12 calculates alternator base torque Tab to maintain the stored amount of electric power, which is output shaft torque necessary for generating the electric power for avoiding loss of stability in the operation of various vehicle-mounted devices or to maintain a reference amount of electric power in the first and second storage batteries 30 and 50.

Figure 2A:
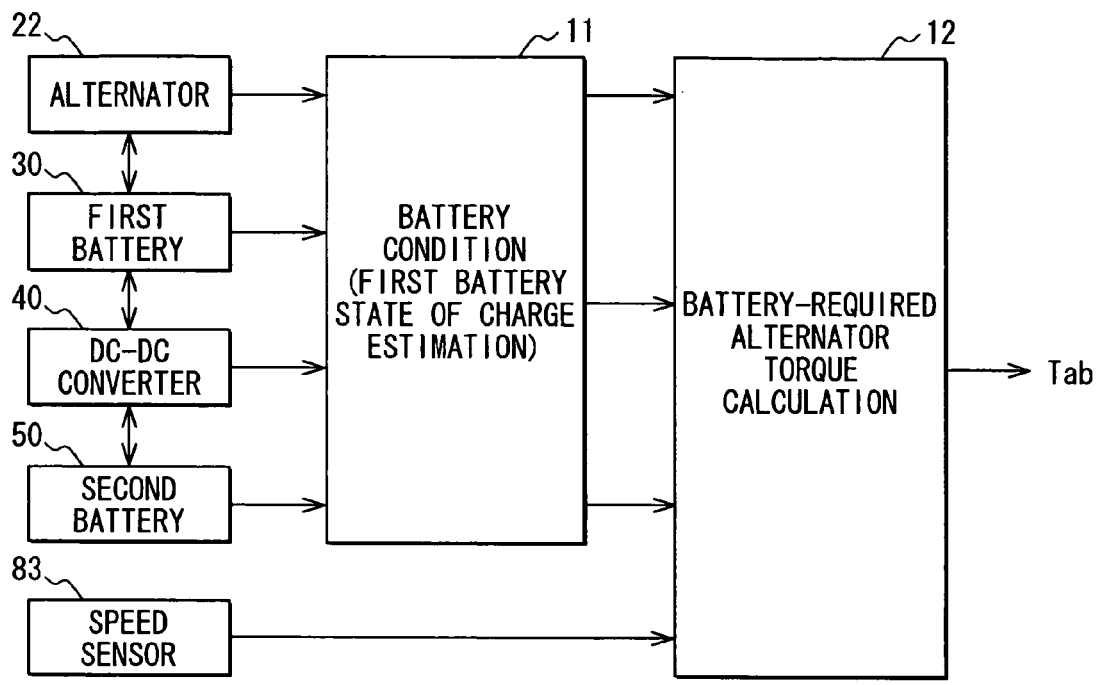
FIG. 2A is a block diagram illustrating a battery condition detection unit and an output shaft torque calculation unit for maintaining stored amount of electric power in the first embodiment.

The battery condition detection unit 11 and the battery-required alternator toque calculation unit 12 are connected as shown in FIG. 2A.

The battery condition detection unit 11 is connected to the first battery 30 and the DC-DC converter 40. The battery condition detection unit 11 receives, from the alternator 22, the voltage and current of electric energy generated by the alternator 22, and receives, from the first battery 30, the voltage and current of electric energy stored in the first battery 30. The battery condition detection unit 11 thus estimates the state of charge of the first battery 30. The battery condition detection unit 11, further, receives, from DC-DC converter 40, the current flowing into the DC-DC converter 40.

The battery condition detection unit 11 is, further, connected to the battery-required alternator toque calculation unit 12 for calculating the alternator base torque Tab for maintaining the stored amount of electric power. Based on various electric currents and voltages that are received, the battery condition detection unit 11 outputs, to the battery-required alternator toque calculation unit 12, the data related to electric energy (required electromotive force) needed by the first and secondary batteries 30 and 50, data related to the upper-limit value of electric energy (permissible generation zone) that can be stored in the first and second batteries 30 and 50, and data related to the condition of storing electric power in the lithium cells constituting the first and second batteries 30 and 50.

The battery-required alternator toque calculation unit 12 may receive the data related to the engine speed from an engine control unit connected to the engine speed sensor 83. Based on the above various data output from the battery condition detection unit 11 to the battery-required alternator toque calculation unit 12 and the engine speed detected by the engine rotational speed sensor 83, the battery-required alternator toque calculation unit 12 calculates the battery-alternator torque necessary for maintaining zero the balance between the electric energy consumed by various vehicle-mounted devices connected to the second battery 50 and the electric energy generated by the alternator 22, i.e., calculates the alternator base torque Tab for maintaining the stored amount of electric power.

The battery-required alternator toque calculation unit 12 and the required output shaft torque calculation unit 17 are connected to a torque division unit 13, and outputs target alternator torque Ta and target engine torque Te. Here, the larger the alternator base torque Tab for maintaining the stored amount of electric power, the more closer the amounts of electric power stored in the first and second batteries 30 and 50 to the reference amounts. Therefore, the electric energy must be generated in large amounts by the alternator 22. The smaller the alternator base torque Tab for maintaining the stored amount of electric power, the larger the amounts of electric power stored in the first and second batteries 30 and 50 than the reference amounts. Therefore, the electric energy does not have to be so much generated by the alternator 22.

The torque division unit 13 divides the sum of the driver-required output shaft torque Tr and the battery-required alternator torque Tab into low frequency torque Trl and high frequency torque Trh. The low frequency torque is generally for target engine torque Te, and the high frequency torque is generally for target alternator torque Ta. This dividing operation is summarized as follows.

$Tr = Trh + Trl$ $Te = Trl - Tab$ $Ta = Trh + Tab$

In the vehicle control system 1, the target engine torque Te includes the alternator base torque Tab for maintaining the stored amount of electric power; i.e., attention is given to the amounts of electric power stored in the first and second batteries 30 and 50. Unlike the conventional system, therefore, operations of the vehicle-mounted devices are prevented from losing stability.

The vehicle has a vehicle chassis and wheels (tires). Spring elements such as suspensions are interposed between the vehicle chassis and the wheels. Vibration occurs at various portions of the vehicle due to various factors, such as rapid acceleration or deceleration of the vehicle and bumps and dents on the road surface. For example, the vehicle chassis vibrates over a low frequency band (first frequency band) of, for example, 5 Hz or lower, and the spring elements vibrate over a high frequency band (second frequency band) of, for example, 10 to 30 Hz.

In order to suppress vibration at various portions of the vehicle, therefore, it is attempted to suppress vibrations occurring at various portions of the vehicle due to various factors by utilizing the torque imparted to the output shaft.

The correction wheel torque calculation unit 14A is provided for estimating vibrating conditions at various portions of the vehicle and for calculating difference torque Twc for the driver-required wheel torque Twd to stabilize the vehicle.

Figure 2B:
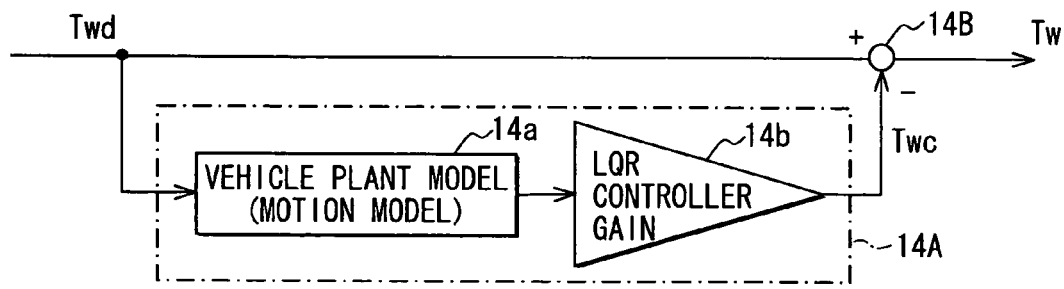
FIG. 2B is a block diagram illustrating a correction torque calculation unit in the first embodiment.

As shown in FIG. 2B, the correction torque calculation unit 14A which, basically, includes a vehicle plant model (motion model) for estimating vibration 14a, a linear quadratic regulator (LQR) controller gain 14b. The vibrating conditions at various portions of the vehicle are estimated through the vehicle plant model 14a and the LQR controller gain 14b, e.g., based on the data related to the vibrating conditions of various portions of the vehicle estimated by the plant model 14a with the estimated wheel torque and on a dynamic model described by an equation of state. In order to decrease the vibration of the vehicle, the correction wheel torque calculation unit 14A calculates a correction wheel torque Twc for vehicle stabilization. The method of calculating the correction torque Twc by using the dynamic model and LQR controller gain 14b are known and is not described here in further detail.

The T/M gear selection unit 15 is connected to the target wheel torque calculation unit 14B which calculates a sum of the driver-required wheel torque Twd and the correction wheel torque Twc, and receives the target wheel torque Tw. Based on the target wheel torque Tw, the T/M gear selection unit 15 selects the gear of the transmission 60. Here, the transmission 60 and the method of selecting the gear are known, and are not described in detail.

The torque actuator control unit 16 is connected to the torque division unit 13 and receives the target engine torque Te and the target alternator torque Ta. The torque actuator control unit 16 is connected to the torque actuator 20, which includes the internal combustion engine 21 and the alternator 22. If vibrations at various portions of the vehicle are of the low frequency band, the internal combustion engine 21 is so controlled that the target engine torque Te is corrected by the correction wheel torque Twc. If vibrations at various portions of the vehicle are of the high frequency band, on the other hand, the alternator 22 is so controlled that the target alternator torque Ta for maintaining the stored amount of electric power used by the alternator 22 is corrected by the correction wheel torque Twc.

Figure 2C:
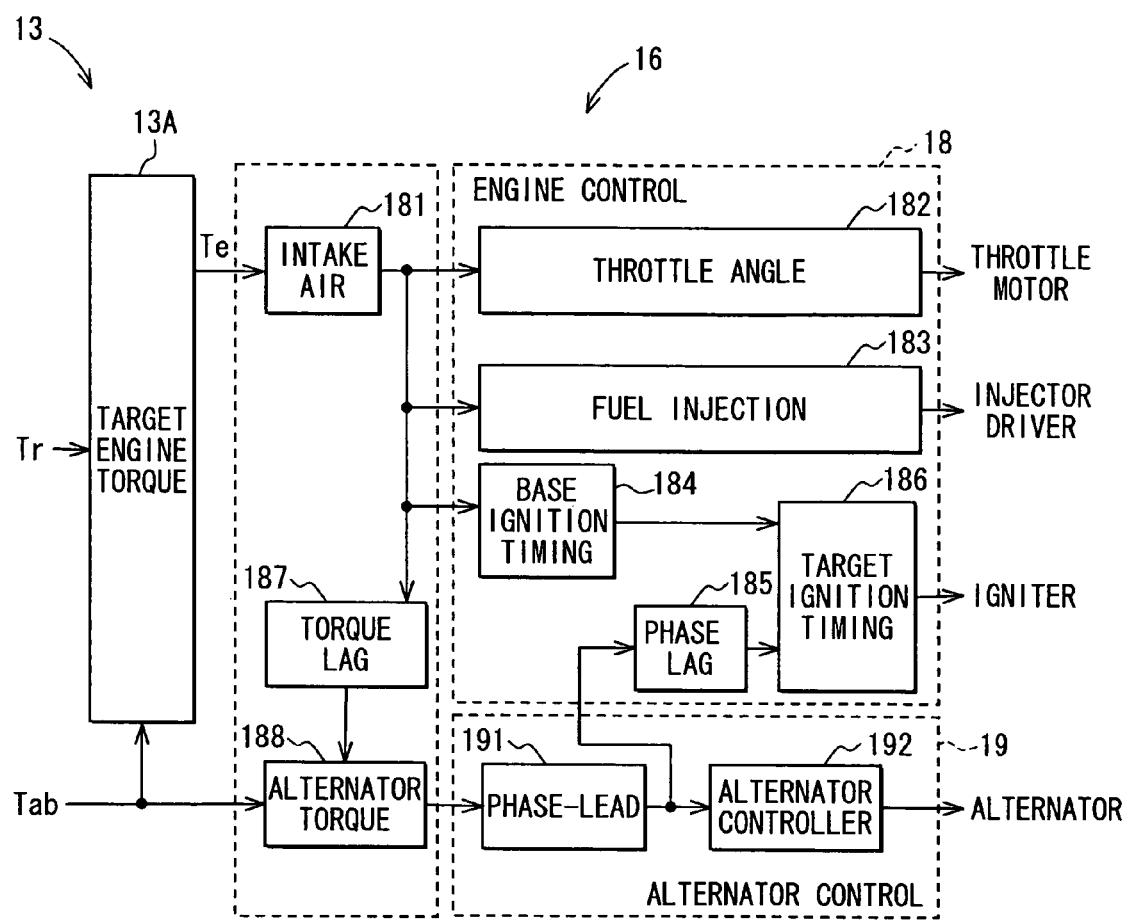
FIG. 2C is a block diagram illustrating a torque actuator control unit in the first embodiment.
Figure 3:
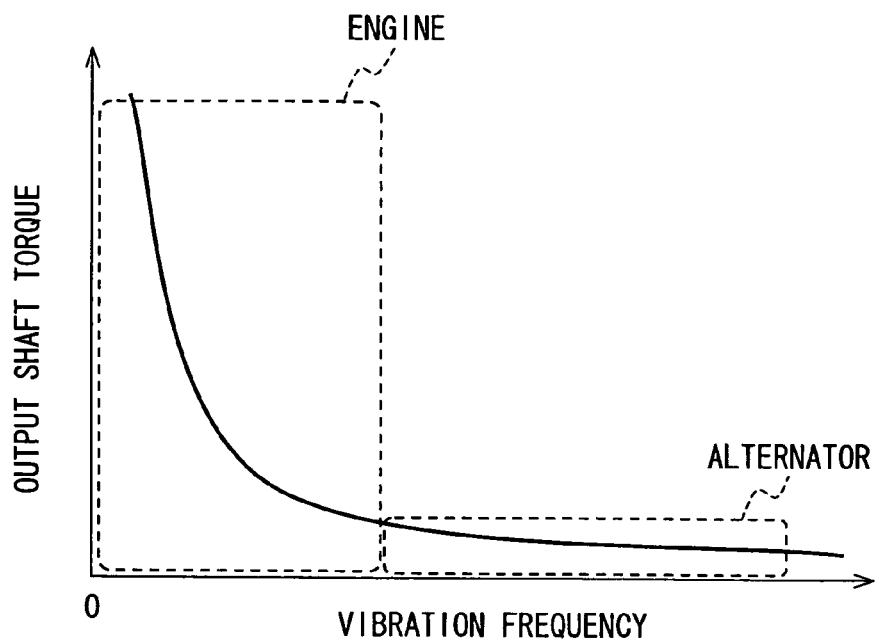
FIG. 3 is a graph illustrating ranges of frequencies and of axle torque that can be coped with by an internal combustion engine and by an alternator mounted on a vehicle.

The target engine torque Te and the required alternator torque Ta are calculated by the torque division unit shown in FIG. 2C. FIG. 3 is a diagram illustrating a relationship between the frequency bands that can be coped with by the internal combustion engine 21 and by the alternator 22 and the magnitudes of the output shaft torque that can be coped with. More specifically, FIG. 3 shows the relationship of output shaft torque between necessary correction torque and torque availability of an engine (by using intake air) and an alternator.

The internal combustion engine 21 causes a lag in the amount of the air taken in by the cylinders following the throttle operation due to the inertia and viscosity of the air, and the torque response frequency lies in the low frequency band of 5 Hz or lower. That is, even if it is attempted to produce the torque of a high frequency band of, for example, 10 to 30 Hz, on the output shaft through the internal combustion engine 21, it is impossible to realize such an output shaft torque. It is, therefore, attempted to decrease vibrations occurring mainly in the vehicle chassis of the vehicle above the springs by producing the torque on the output shaft through the internal combustion engine 21.

Further, the alternator 22 can generate electricity by using (consuming) an output shaft torque in a high frequency band of, for example, 10 to 30 Hz. That is, the alternator torque can be controlled by controlling to generate amount of electricity. By consuming the output shaft torque through the alternator 22, therefore, it is attempted to decrease the vibrations occurring in the vehicle chiefly under the springs (between the wheels and the chassis).

By taking the characteristics of the internal combustion engine 21 and of the alternator 22 into consideration as described above, the torque actuator control unit 16 controls the internal combustion engine 21 and the alternator 22 so that the required output shaft torque is realized.

An example of the torque actuator control unit 16 and torque division unit 13 will now be described with reference to FIG. 2C. The torque division unit 13 basically has a target engine torque calculation unit 13A. The torque actuator control unit 16 has an internal combustion engine control unit 18 and an alternator control unit 19.

The target engine torque calculation unit 13A calculates target engine torque Te, which is sum of the required output shaft torque Tr and the required alternator torque Tab, where the required alternator torque Tab is converted to corresponding torque at output shaft with pulley ratio.

Basically, further, the torque division unit 16 includes an intake air amount calculation unit 181, which estimates engine torque lag and requires high frequency torque to the alternator 22. The internal combustion engine control unit 18 includes a throttle angle calculation unit 182, a fuel injection amount calculation unit 183, a base ignition timing calculation unit 184, phase lag estimating unit 185 and a target ignition timing correction unit 186. Here, the target engine torque calculation unit 13A of the torque division unit 13 is connected to the internal combustion engine control unit 18 connected to a throttle motor, an injector driver, an igniter and the like (not shown).

The air amount calculation unit 181 calculates the amount of the air necessary for producing the target engine torque Te. Upon calculating the amount of the air, the air amount calculation unit 181 outputs the data related to the calculated amount of the air to the throttle angle calculation unit 182, fuel injection amount calculation unit 183, base ignition timing calculation unit 184. The torque lag estimation unit 187 calculates air intake lag which causes engine torque lag, and outputs corrected alternator torque to an alternator torque calculation unit 188 in order to compensate for the engine torque lag.

Upon receiving the data related to the amount of the intake air from the air amount calculation unit 181, the throttle angle calculation unit 182 calculates the throttle angle necessary for introducing the above amount of the intake air into the combustion chambers of the internal combustion engine 21, and drives the throttle motor to realize the calculated throttle angle.

Upon receiving the data related to the amount of the intake air from the air amount calculation unit 181, further, the fuel injection amount calculation unit 183 calculates the amount of fuel injection that meets the amount of the intake air, and drives the injector via the injector driver in order to inject the fuel by the calculated amount into the combustion chamber.

Upon receiving the data related to the amount of the intake air from the air amount calculation unit 181, further, the base ignition timing calculation unit 184 calculates the base ignition timing which is in general "Minimum spark advance for Best Torque (MBT)" by using the above amount of intake air and, further, outputs the data related to the base ignition timing to the ignition timing correction unit 186 connected to the subsequent stage. The ignition timing correction unit 186 basically drives the igniter at the ignition timing operated by the base ignition timing calculation unit 184 to ignite.

Here, however, the intake air has inertia and viscosity and, therefore, phase lag occurs necessarily from the start of taking in the air until the air is actually introduced into the combustion chamber of the internal combustion engine 21. Therefore, upon receiving the necessity for coping with the lag or delay by the ignition system from the alternator control unit 19, the ignition timing correction unit 186 drives the igniter by advancing or delaying the base ignition timing calculated by the base ignition timing calculation unit 184.

The torque lag estimating unit 187 estimates the lag in the intake, and outputs the data related to the lag of intake to the alternator control unit 19.

As shown in FIG. 2C, on the other hand, the alternator control unit 19 includes a phase-lead compensator 191 and an alternator controller (duty ratio calculation unit) 192. The phase-lead compensator 191 is connected to the battery-required alternator torque calculation unit 12 and calculates and compensates for the lag of alternator torque. Furthermore, phase lag estimation unit 185 estimates the high frequency torque, which the alternator has no ability to output, and outputs the alternator torque lag to the ignition timing correction unit 186. The internal combustion engine control unit 18 and the alternator control unit 19 are widely known, and are not described here in further detail.

The vehicle control processing executed by the vehicle control system 1 will now be described with reference to a flowchart shown in FIG. 4. This control processing may be preferably executed by a programmed microcomputer (not shown). It is assumed here that the internal combustion engine 21 mounted on the vehicle is in operation already.

Figure 4:
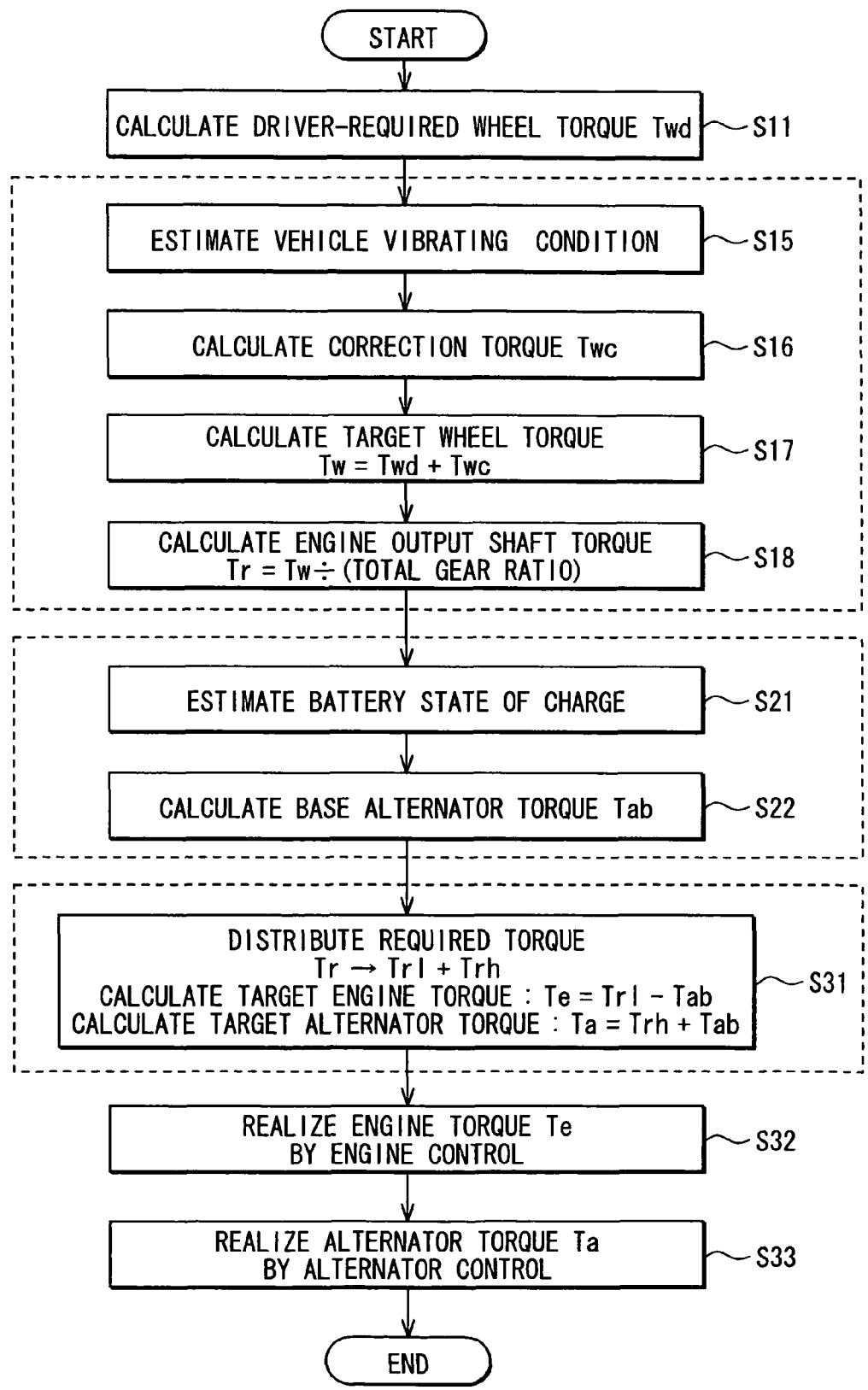
FIG. 4 is a flowchart illustrating a procedure of vehicle control processing executed in the first embodiment.

Referring to FIG. 4, when the vehicle control processing starts, the vehicle control system 1 (driver-required wheel torque calculation unit 10), first, calculates the driver-required wheel torque Twd required by the driver as processing at step S11. The vehicle control system 1 reads the amount the accelerator pedal 81 is depressed that is detected by the accelerator stroke sensor 82, and calculates the driver-required wheel torque Twd.

Upon calculating the wheel torque Twd, the vehicle control system 1 (correction wheel torque calculation unit 14) estimates vibrating conditions at various portions of the vehicle (FIG. 2B) as processing at subsequent step S15. The correction wheel torque calculation unit 14 receives the driver-required wheel torque (or estimated wheel torque) Twd and estimates the vibrating conditions at various portions of the vehicle by using the dynamic vehicle motion model. As processing at subsequent step S16, the vehicle control system 1 calculates the correction wheel torque Twc for the driver-required wheel torque Twc in order to decrease vibration at various portions of the vehicle estimated through the processing at preceding step S15.

As processing at subsequent step S17, the target wheel torque calculation unit 14B calculates the target wheel torque Tw which is the sum of the driver-required wheel torque Twd and the correction wheel torque Twc.

As processing at subsequent step S18, the required output shaft torque calculation unit 17 translates the target wheel torque Tw into the required output shaft torque Tr by using the gear ratio which is received from T/M gear selection unit 15.

As processing at subsequent step S21, the alternator control system 1 (battery condition detection unit 11) detects a current and a voltage of electric energy generated by the alternator 22, a current and a voltage of electric energy stored in the first storage battery 30, a current flowing into the DC-DC converter 40, and forms data related to the required electromotive force, allowable generation zone and state of storing the electric power based thereupon (FIG. 2A). After the processing at step S21, the vehicle control system 1 (battery-required alternator toque calculation unit 12) calculates the alternator base torque Tab for maintaining the stored amount of electric power as processing at subsequent step S22. Based on the engine speed received from the engine control unit and the electrically charged state of the battery detected by the battery condition detection unit 11, the battery-required alternator toque calculation unit 12 calculates the alternator base torque Tab for maintaining the stored amount of electric power, which is a maintaining torque necessary for bringing into zero the balance between the electric energy consumed by various vehicle-mounted devices connected to the second storage battery 50 and the electric energy generated by the alternator 22.

As processing at subsequent step S14, the vehicle control system 1 (torque division unit 13) calculates the target engine torque and the target alternator torque based upon the required output shaft torque Tr and upon the alternator base torque Tab for maintaining the stored amount of electric power. The alternator base torque Tab for maintaining the stored amount of electric power is thus added to the required output shaft torque in order to calculate the target engine torque and the target alternator torque, and the torque division unit divides it between a low frequency torque and a high frequency torque. Therefore, the operations of the vehicle-mounted devices do not lose stability.

As processing at step S31, various torque Tr, Te and Ta are calculated as described above. That is, the target engine torque Te and the target alternator torque Ta are calculated based on the target output shaft torque Tr and the alternator base torque Tab.

As processing at subsequent step S32, the torque actuator control unit 16 controls the internal combustion engine 21 to realize low frequency torque. As a result, vibrations of the low frequency band occurring in the vehicle are thus decreased by using the engine torque control.

As processing at subsequent step S33, the torque actuator control unit 16 controls the alternator 22 to realize high frequency torque. As a result, vibrations of the high frequency band occurring in the vehicle are thus decreased by using the alternator torque control.

Figure 5:
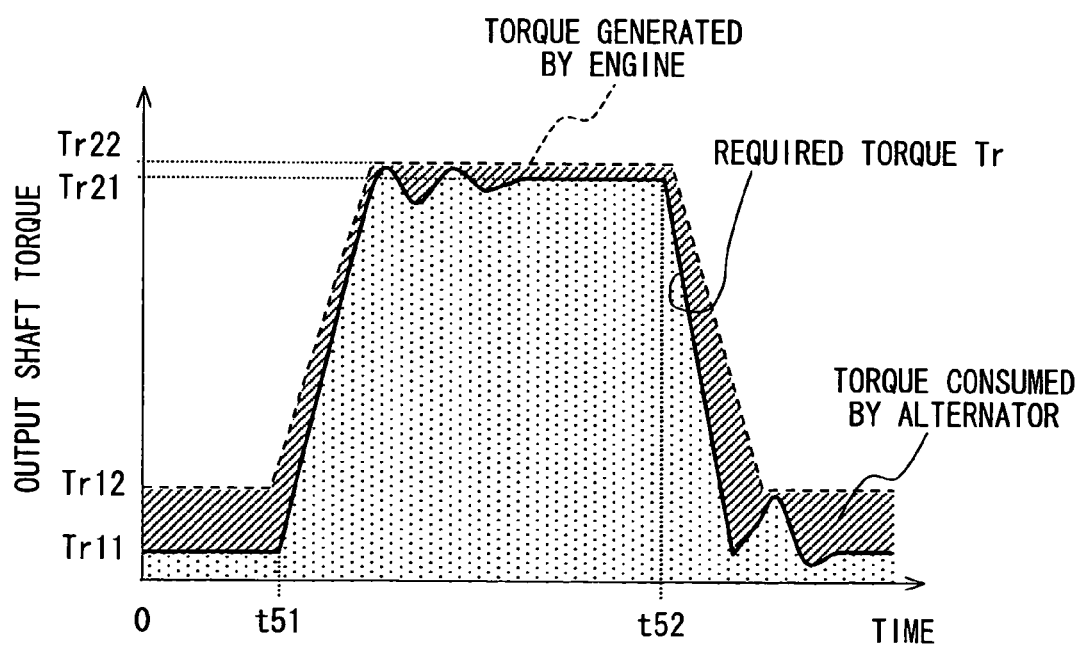
FIG. 5 is a graph illustrating shifts of output shaft torque in the first embodiment.

FIG. 5 illustrates shifts of various output shaft torque in the vehicle control system 1 of the embodiment. It is estimated here that the required output shaft torque Tr of the vehicle is changed with respect to time as represented, for example, by a solid line. The required output shaft torque Tr first assumes a constant value of, for example, Tr11, starts increasing, for example, from a moment t51, repeats an increase and a decrease, once settles to assume a constant value of, for example, Tr21, and, thereafter, starts decreasing, for example, from a moment t52, repeats an increase and a decrease again, and settles to assume the constant value Tr11.

The required output shaft torque Tr is equal to the sum of the target engine torque Te and the target alternator torque Ta which is negative torque for generating electricity. Therefore, the target engine torque Te undergoes a shift as represented, for example, by a broken line, and the target alternator torque Ta is a difference between the required output shaft torque Tr and the target engine torque Te in FIG. 5. The torque produced by the internal combustion engine 21 assumes a constant value of, for example, Tr12, starts increasing, for example, at the moment t51, is shifted to assume a constant value of, for example Tr22, starts decreasing, for example, at the moment t52, and assumes the constant value Tr12 again. The torque of hatched portions obtained by subtracting the required output shaft torque Tr the sum of the target engine torque Te and the target alternator torque Ta which is a quantity consumed for power generation by the alternator 22.

Here, the difference between Tr22 and Tr21 from the moment t51 to the moment t52 is basically smaller than the difference between Tr11 and Tr12 of up to the moment t51. This phenomenon arises from a decrease in the absolute value of the torque that is consumed by the alternator 22 since a larger output shaft torque is necessary for the vehicle control system 1 to compensate for a delay of response and a lag of the intake air in the intake system of the internal combustion engine 21.

The difference between Tr11 and Tr12 after the moment t52 is basically larger than the difference between Tr22 and Tr21 of from the moment t51 to the moment t52. This phenomenon arises from an increase in the absolute value of the torque that is consumed by the alternator 22 since so large an output shaft torque is not necessary for the vehicle control system 1 to compensate for a delay of response and a lag of the intake air in the intake system of the internal combustion engine 21.

The required output shaft torque Tr repetitively increases and decreases before being settled to the constant value Tr21 while the torque produced by the internal combustion engine 21 is settled to the constant value Tr22 right after the end of change. The required output shaft torque Tr, further, repetitively increases and decreases before being settled again to the constant value Tr11 while the torque produced by the internal combustion engine 21 is settled to the constant value Tr12 right after the end of change. These phenomena arises from driving the alternator 22 in order to realize a correction wheel torque Twc necessary for suppressing high-frequency vibrations.

According to the vehicle control system 1 of this embodiment, the amount of electric power can be favorably maintained in the first and second storage batteries 30 and 50 while suitably suppressing vibrations occurring at various portions of the vehicle.

Second Embodiment

Figure 6:
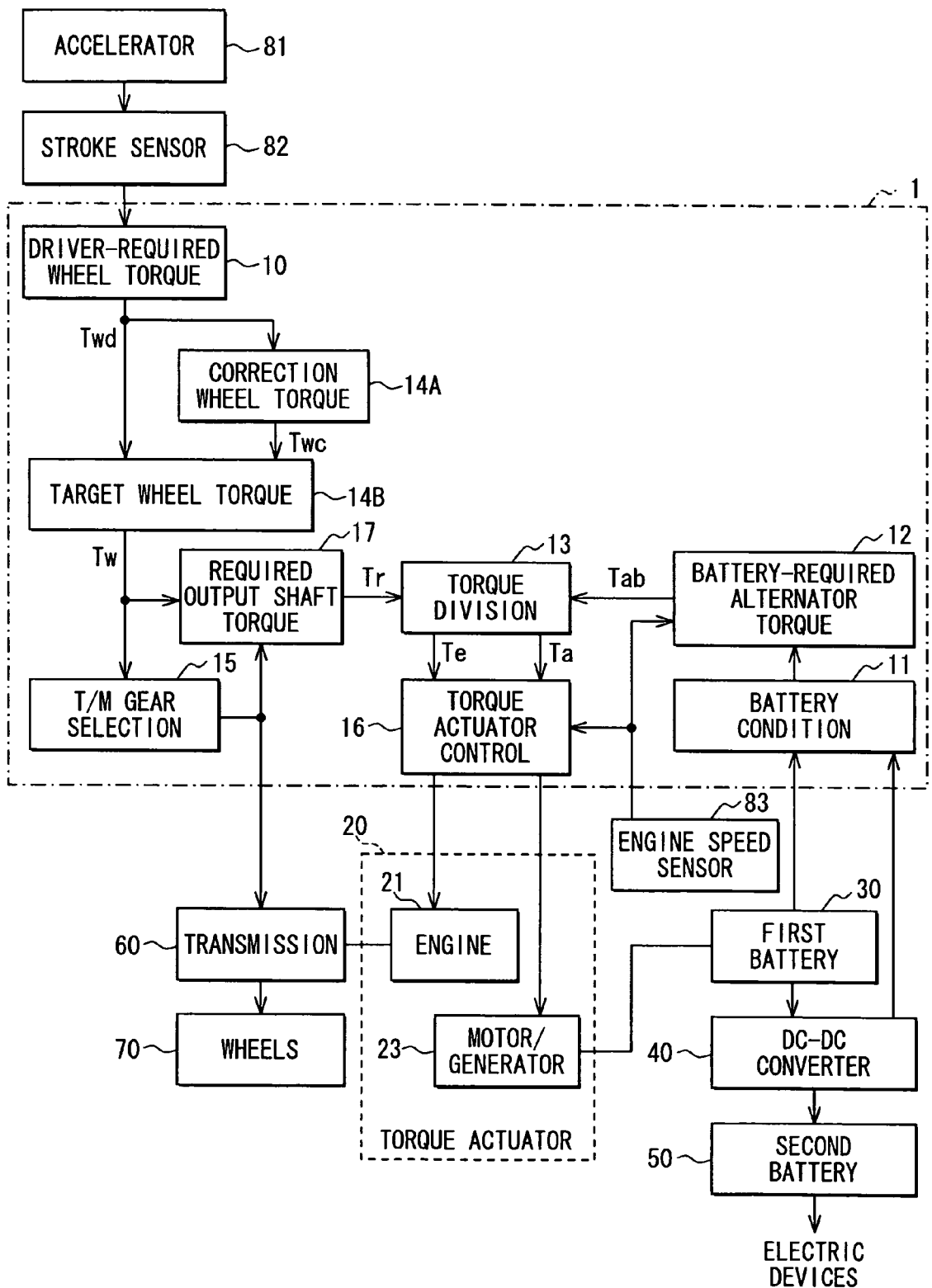
FIG. 6 is a block diagram illustrating a second embodiment of the vehicle control system of the invention.

In a second embodiment, as shown in FIG. 6, a motor-generator 23 having a motor function and a generator function is used in place of the alternator 22 in the first embodiment. When this vehicle control system 1 is mounted on a hybrid vehicle, the first storage battery 30 need be configured to store the electric power generated by the motor-generator 23 when the motor-generator 23 works as a generator and feed the electric power to the motor-generator 23 when the motor-generator 23 works as a motor. The second storage battery 50 may be configured to feed electric power to the vehicle-mounted devices as in the first embodiment. The vehicle control system 1 makes possible to provide not only the same advantage as that of the first embodiment but also the following advantages. That is, the motor-generator 23 works not only as the generator but also as the motor, and makes it possible to increase the output shaft torque produced by the power plant 20 and, therefore, to easily suppress vibrations occurring on the vehicle chassis while the vehicle is traveling.

The vehicle control system according to the invention is not limited to the above embodiments only, but can be implemented in many other ways.

For example, in place of the storage batteries 30 and 50, capacitors of large capacities may be employed as a storage unit. The response frequency of the internal combustion engine 21 and the response frequency of the generator such as the alternator 22 or the motor-generator 23 need not be limited to, for example, 5 Hz or lower and 10 to 30 Hz, respectively. The response frequency bands may be set to other frequencies, as long as the response frequency band of the generator is set to be higher than the response frequency band of the internal combustion engine. The internal combustion engine 21 may be a diesel engine in place of a spark ignition engine.

What is claimed is:

1. A vehicle control system comprising:
    a storage battery unit connected to vehicle-mounted devices to feed electric power to the vehicle-mounted devices;
    a charging condition detection unit for detecting a charging condition of the storage battery unit;
    a torque actuator including an internal combustion engine and a generator that generates electricity by using a torque of an output shaft of the internal combustion engine and electrically charges the storage battery unit; and
    a driver-required wheel torque calculation unit for calculating a driver-required wheel torque;
    a correction wheel torque calculation unit for estimating vibrating conditions of a vehicle, and calculating a correction wheel torque for the driver-required wheel torque to decrease vibrations of the vehicle;
    a target wheel torque calculation unit for calculating a target wheel torque based on the driver-required wheel torque and the correction wheel torque;
    a required output shaft torque calculation unit for calculating a required output shaft torque, which is to be generated by the torque actuator, based on the target wheel torque;
    a battery-required generator torque calculation unit for calculating a battery-required generator torque required to generate electric power for maintaining a predetermined base amount of the electric power by monitoring an amount of electric power stored in the storage battery unit;
    a torque division unit for dividing the required output shaft torque into a low frequency component and a high frequency component and calculating a target engine torque and a target generator torque, the target engine torque being calculated as a difference between the low frequency component and the battery-required generator torque, and the target generator torque being calculated as a sum of the high frequency component and the battery-required generator torque;
    a torque actuator control unit for controlling the internal combustion engine and the generator to realize the target engine torque and the target generator torque by the internal combustion engine and the generator, respectively.

2. The vehicle control system according to claim 1, wherein:
    a response frequency band of the generator is higher than a response frequency band of the internal combustion engine.

3. The vehicle control system according to claim 1, wherein:
    the generator is an alternator; and
    the storage battery unit includes a first storage battery for storing the electric power generated by the alternator, a second storage battery connected to the vehicle-mounted devices to feed the electric power to the vehicle-mounted devices, and a voltage regulator unit connected between the first storage battery and the second storage battery to regulate the voltages of electric power stored in the first storage battery and the second storage battery.

4. The vehicle control system according to claim 1, wherein
    the generator is a motor-generator having a motor function; and
    the storage battery unit includes a first storage battery to store the electric power generated by the motor-generator when the motor-generator operates as a generator and feed the electric power to the motor-generator when the motor-generator operates as a motor, a second storage battery connected to the vehicle-mounted devices to feed the electric power to the vehicle-mounted devices, and a voltage regulator unit connected between the first storage battery and the second storage battery to regulate the voltages of electric powers stored in the first and second storage batteries.

* * * * *